May 16, 1939.　　　J. M. DALIMATA　　　2,158,745
CHAFF BALING ATTACHMENT FOR A HARVESTER
Filed Sept. 11, 1937　　　5 Sheets-Sheet 1
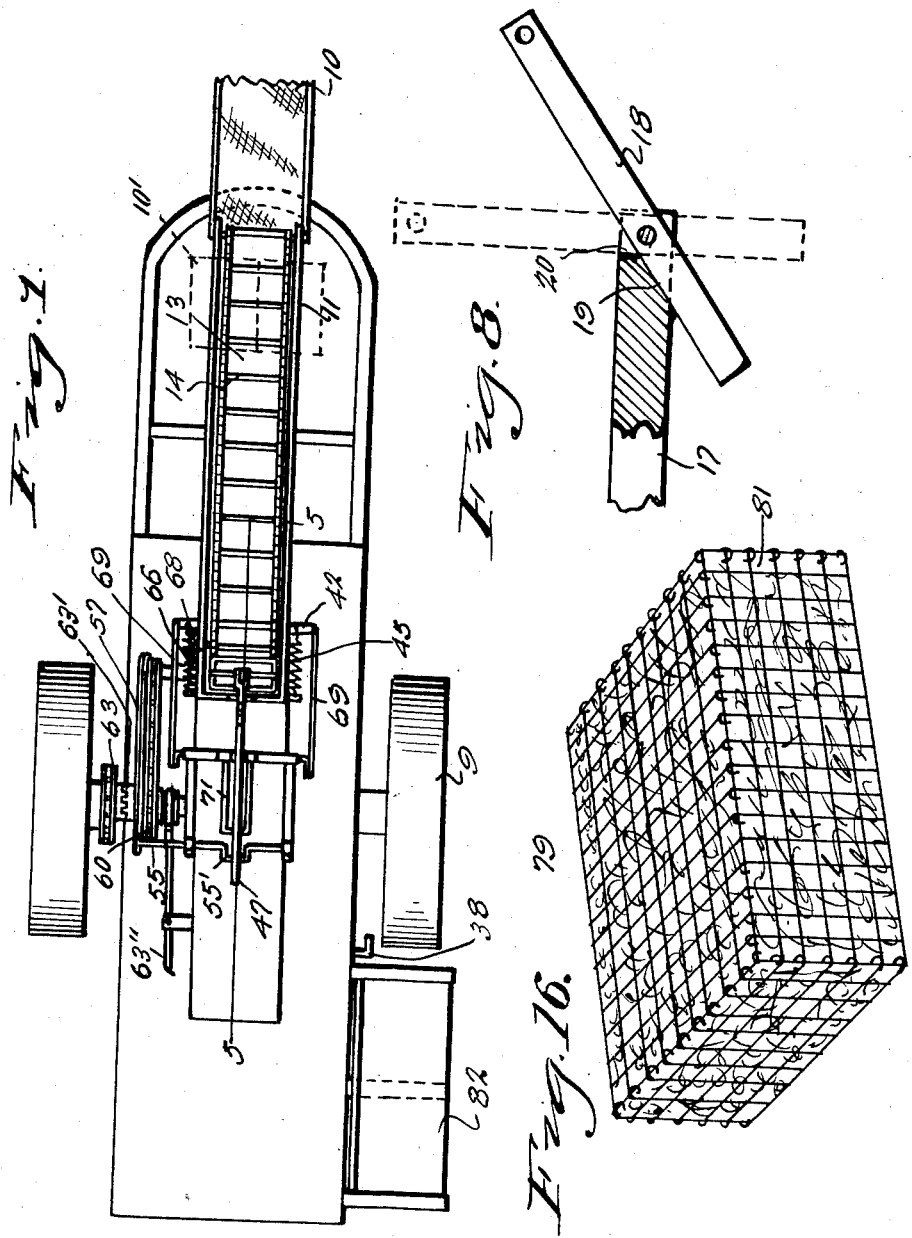
Inventor
John M. Dalimata
By Clarence A. O'Brien
Hyman Berman
Attorneys

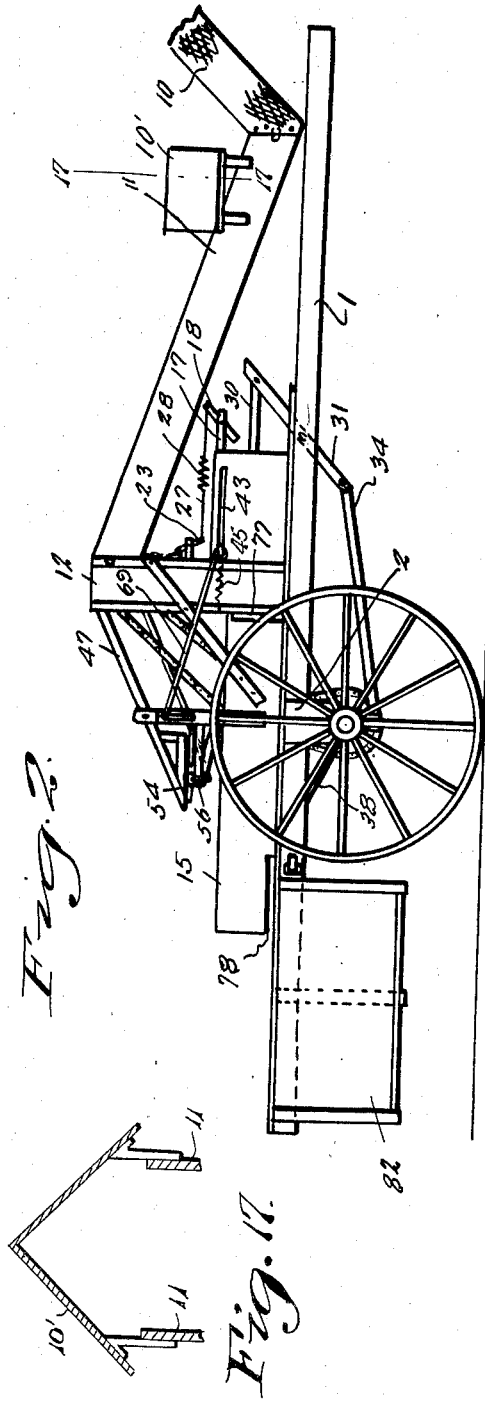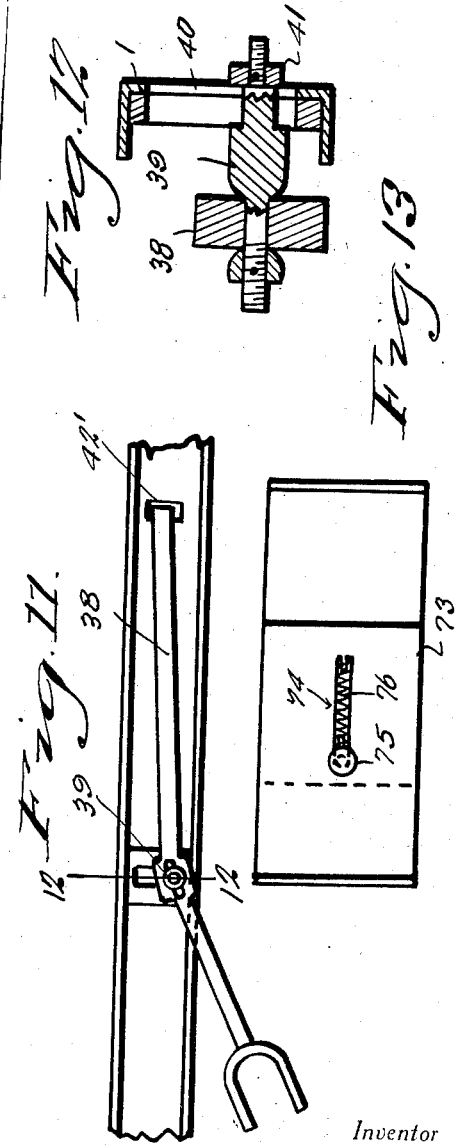

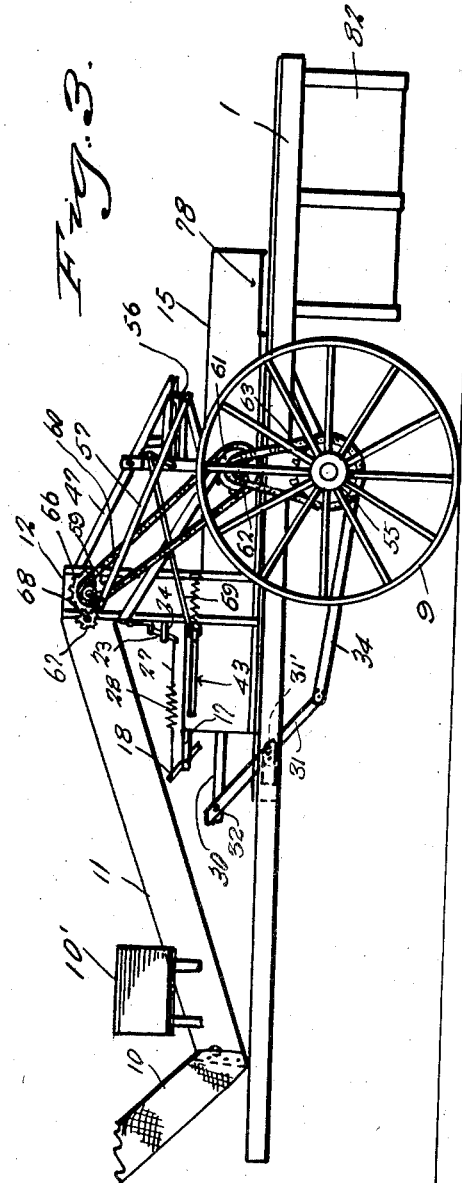
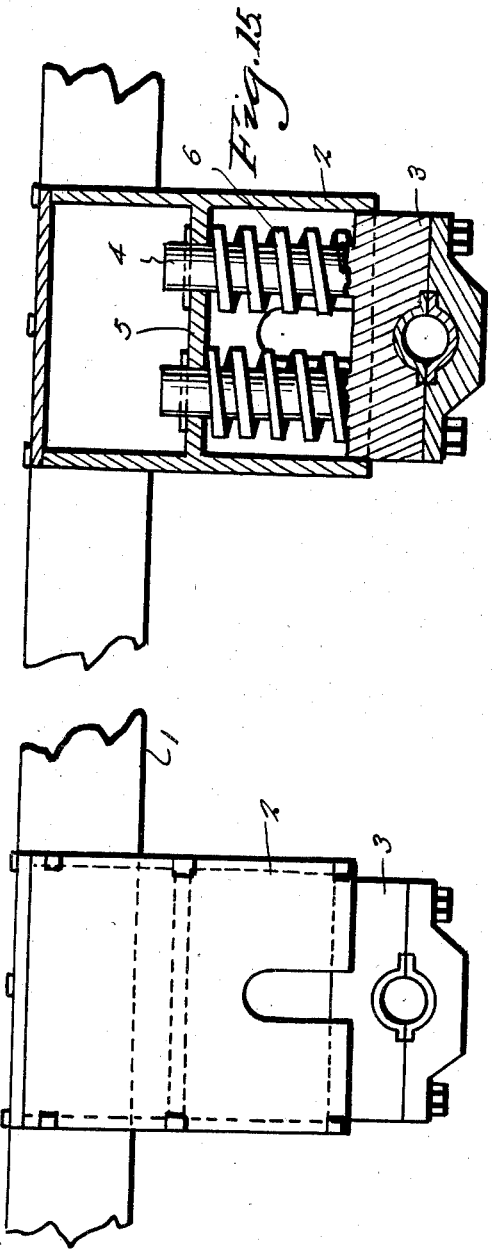

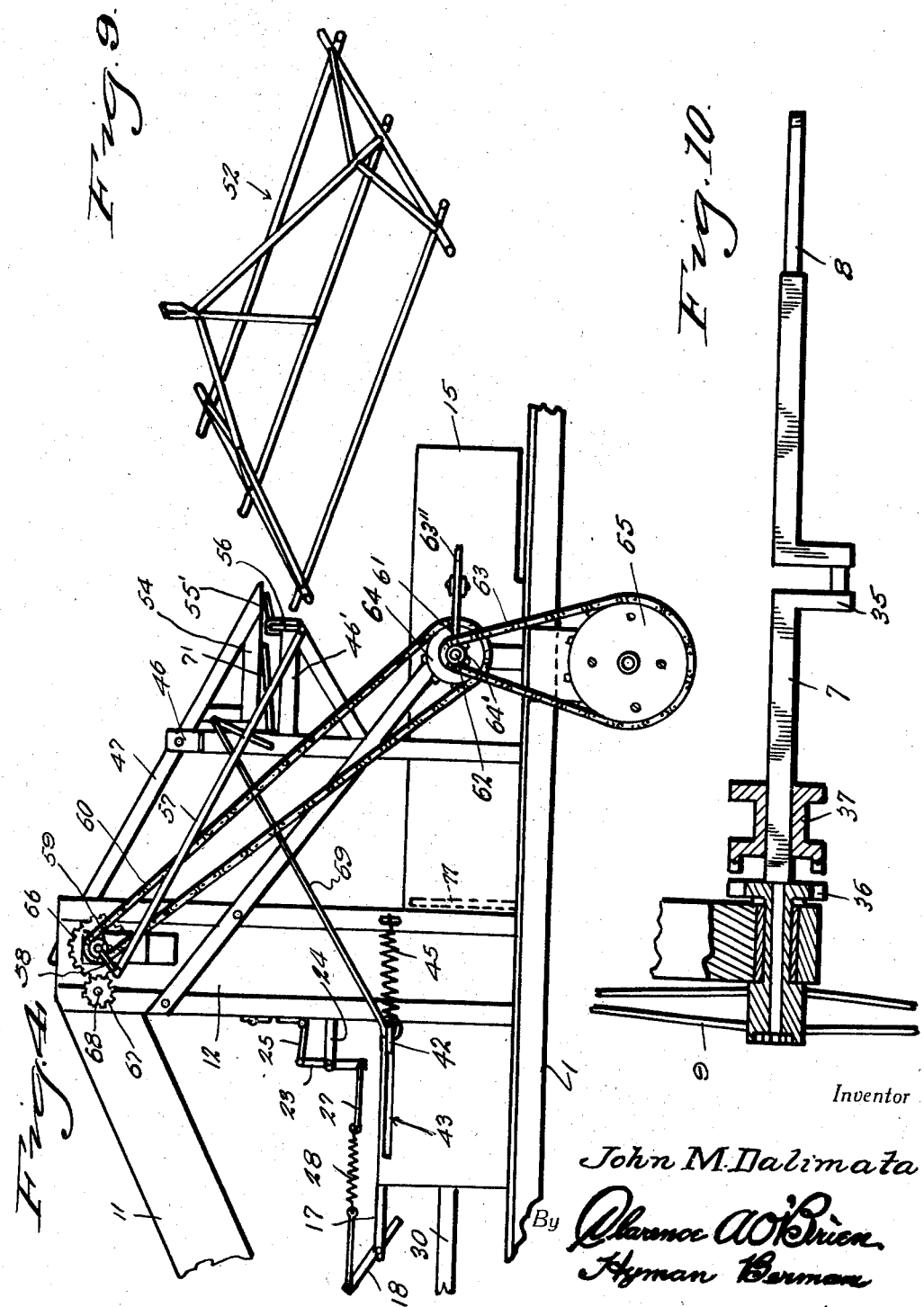

May 16, 1939.  J. M. DALIMATA  2,158,745
CHAFF BALING ATTACHMENT FOR A HARVESTER
Filed Sept. 11, 1937    5 Sheets-Sheet 5
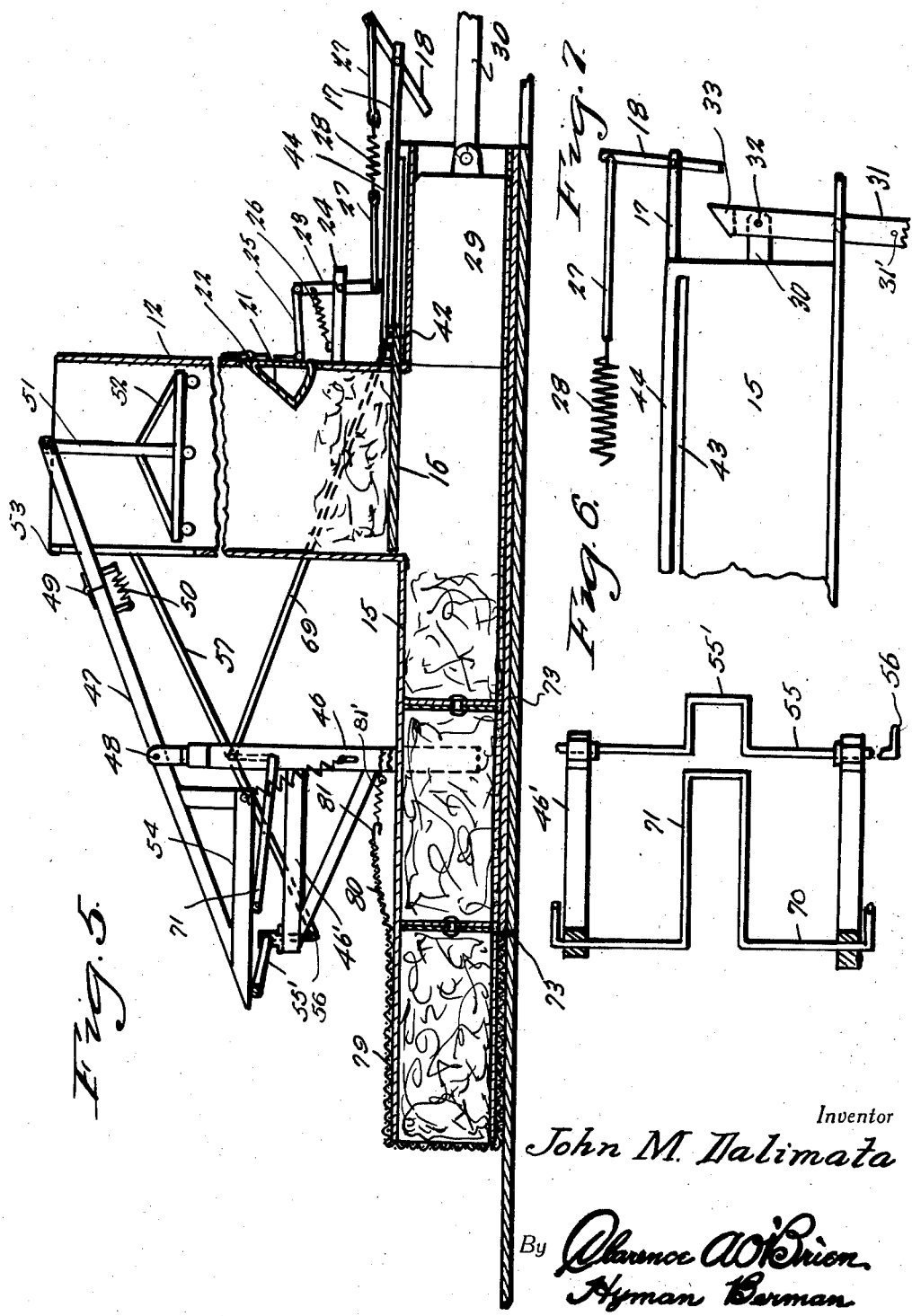
Inventor
John M. Dalimata
By Clarence A. O'Brien
Hyman Berman
Attorneys Patented May 16, 1939

2,158,745

UNITED STATES PATENT OFFICE 2,158,745

CHAFF BALING ATTACHMENT FOR A HARVESTER

John M. Dalimata, Chester, Mont.

Application September 11, 1937, Serial No. 163,484

4 Claims. (Cl. 100—25)

This invention relates to a chaff baling attachment for a combine or harvester, the general object of the invention being to provide means for conveying the chaff from the threshing part of the combine and delivering it into a hopper, with means for pressing the chaff into bales and enclosing each bale in wire mesh so that the chaff can be stacked in bales and thus kept for a long time so that this material can be used as feed when other kinds of feeds are scarce and not accessible.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the invention.

Figure 2 is an elevational view looking toward one side thereof.

Figure 3 is an elevational view looking toward the opposite side.

Figure 4 is a fragmentary elevation of the intermediate part of the device with the wheels removed.

Figure 5 is a section on the line 5—5 of Figure 1.

Figure 6 is a detail view of the two cranks for operating the packer mechanism.

Figure 7 is a fragmentary elevation of the front end of the plunger chamber and the parts associated therewith.

Figure 8 is a detail view partly in section showing the two positions of the bar connected with the shank of the door which supports the material in the hopper.

Figure 9 is a detail view of the tamper.

Figure 10 is a detail view of the crank axle, which has the wheel spindles at its ends, this view also showing a part of one wheel, a part of a bearing and the clutch.

Figure 11 is a detail elevational view showing the forked lever for operating the clutch.

Figure 12 is a section on the line 12—12 of Figure 11.

Figure 13 is a detail view of one of the partition members or dividers.

Figure 14 is an elevational detail view of one of the bearing members on the shaft.

Figure 15 is a vertical sectional view through the same.

Figure 16 is a view of one of the completed bales.

Figure 17 is a sectional detail view on line 17—17 of Figure 2.

In these drawings, the numeral 1 indicates the body of the machine and said body has a bearing box 2 at each side thereof, in each of which is movably arranged a bearing member 3 which projects from the lower end of the box and said bearing member has a pair of studs 4 rising therefrom and passing through holes in a partition 5 in the box, springs 6 encircling the studs and bearing against the partition 5 and tending to move the bearing members downwardly. A shaft 7 is formed with the spindles 8 at its ends which are rotatably supported in the bearings 3 and the hubs of wheels 9 are rotatably supported on the outer ends of the spindles, as shown more particularly in Figure 10. Thus the body is yieldably supported by the axle and the wheels. The front end of the body is adapted to be attached in any suitable manner to the rear end of a combine so that the apparatus acts as a trailer for the combine.

A downwardly and rearwardly sloping chute 10 of canvas or the like is connected to a part of the combine and receives the chaff from the threshing mechanism of said combine. The chute discharges into the lower end of a conveyor trough 11 which slopes upwardly and rearwardly to the upper end of a vertically arranged hopper 12 located on an intermediate part of the body 1. An endless conveyor shown generally at 13 operates in the trough 11 and said conveyor consists of the usual endless belt having strips 14 thereon, this conveyor receiving the material from the chute 10 and carrying it upwardly and rearwardly and finally dropping it into the hopper 12.

An elongated horizontally arranged housing or casing 15 extends longitudinally on the body and the lower end of the hopper 12 opens out into the top of an intermediate portion of the casing. A sliding door 16 normally closes communication between the bottom of the hopper 12 and the casing 15. This door has a shank 17 connected therewith and a bar 18 is pivoted to the outer end of the shank, as shown in Figure 8. This bar can assume either one of two positions, as shown in full and dotted lines in Figure 8. When in an inclined position it engages the sloping shoulder 19 formed by a wall of a slot in the shank, in which the bar 18 is pivoted and when in a vertical position it will engage a brake shoulder 20, as shown in dotted lines in Figure 8.

A substantially triangular-shaped door 21 operates in an opening formed in a side of the hopper 12 and is pivoted at its upper end or apex as shown at 22. A lever 23 is pivoted intermediate its ends to a bracket 24 projecting from the hopper and a link 25 connects the upper end of this lever with the door 21. A spring 26 connects the upper part of the lever 23 with the bracket, this spring tending to hold the parts in the position shown in Figure 5 with the door 21 extending into the hopper. Linkage 27, which includes a spring 28, connects the lower end of the lever 23 with the upper end of the bar 18. The spring 28 is not strong enough to move the bar 18 into a vertical position, when the parts are in the position shown in Figure 5, but, when the spring 28 is stretched by outward movement of the door 21 causing the lever 23 to exert a pull upon the linkage 27, the bar 18 is moved to a vertical position as shown in dotted lines in Figure 8.

A plunger 29 is located in the front end of the casing 15 and a rod 30 is connected therewith. A lever 31, pivotally connected, as at 31' with a part of the body intermediate the ends of the lever, has its upper part pivoted to the outer end of the rod 30 as shown at 32. The lever extends beyond the pivotal point 32 where it is provided with a beveled part 33 which will slide over the lower end of the bar 18, when the bar is in vertical position and when the plunger is being moved inwardly with respect to the casing 15. However, when the plunger is being moved outwardly and the bar 18 is in vertical position the straight edge of the projecting end of the lever 31 will strike the lower end of the bar 18 and as the bar cannot move beyond the vertical position shown in dotted lines in Figure 8, the bar with the shank 17 and the door 16 must move outwardly with the plunger and the lever 31 and thus the door 16 is moved to open position. The lower end of the lever 31 is pivoted to a connecting rod 34 which has its other end connected with the crank 35 of the shaft 7. One of the wheels 9 has a clutch part 36 connected with its hub which is adapted to be engaged by a sliding clutch part 37 on the shaft 7 so that when the clutch parts are in engagement with each other the shaft 7 will turn with the wheels and this turning movement of the shaft will reciprocate the plunger 29 through means of the connecting rod 34, the lever 31 and the rod 30. As before stated if the door 21 is in its outward position the bar 18 will be in the path of the upper end of the lever 31 and this will cause the sliding door 16 to be opened by outward movement of the plunger so that the material in the hopper can be forced into the casing 15 where it will be compressed by the plunger. The clutch part 37 is operated by means of the forked lever 38 having its fork engaging the part 37 and said lever is pivotally and rockably supported on a stud 39 attached to a part of the body 1 by having a part passing through a slot 40 in a part of the body and held therein by a nut 41 threaded to a projecting part of the stud. A handle part of the lever 38 passes through an opening 42' in a side of the body 1 so that the lever can be manipulated to engage and disengage the clutch part.

A bar 42 is attached to the outer end of the sliding door 16 and has its ends passing through the slots 43 formed in the sides of the guideways 44 for the door, these guideways being formed by extensions of the front part of the casing 15. Springs 45 connect the ends of the bar with stationary parts and tend to hold the door 16 in closed position as shown in Figure 5.

An upright frame 46 is carried by the body and includes the horizontal part 46'. A walking beam 47 is pivoted to the top of the vertical portion as shown at 48 and the forward end of the beam is hinged to the major part as shown at 49. Spring means 50 holds the said front end in alignment with the rest of the lever, this spring and hinge means acting as a safety device to prevent damage to the beam if the front end thereof were prevented, for any reason, from moving downwardly; for if this occurs the front end will move upwardly on the hinge and against the action of the spring. The shank 51 of a packer member 52 is pivoted to the front end of the beam and acts to pack the material in the hopper, the hopper having a slot 53 therein through which the beam extends. The front part of the beam is much longer than its rear part and a depending frame 54 is connected with the rear part.

A crankshaft 55 having a short crank is journaled in the outer part of the horizontal portion 46' of the frame 46, the crank 55' engaging the rear end of the frame 54 so that as the shaft 55 is rocked the crank 55' will cause the beam 47 to rock on its pivot and thus the packer 52 will be reciprocated in the hopper to pack the material therein. An arm 56 is connected with the shaft 55 and a rod 57 connects this arm with an arm 58 connected to a sprocket 59, carried by a shaft journaled in the top part of the hopper. A chain 60 passes over sprocket 59 and over sprocket 64 on the shaft 62 and a chain 63 passes over a sprocket 65 attached to one of the wheel hubs, and a small sprocket 64' on shaft 62. Clutch means 63' and including a hand lever 63'' engage the sprocket 64 with the sprocket 64' when the packer is to be actuated.

A gear 66 is connected to the shaft of the sprocket 59 and meshes with a gear 67 on the shaft 68 which drives the conveyor 13.

Rods 69 are connected with the cross piece 42 of the door 16 and these rods are connected with the arms at the ends of a crankshaft 70 journaled in the frame part 46' and having a long crank 71, as shown in Figure 6. This arrangement causes the opening movement of the door 16 to operate the shaft 70 so that the crank 71 thereof will raise the rear end of the beam 47 and cause the packer 52 to move downwardly to a greater extent than it does when operated by the short crank on the shaft 55, and this movement will cause the packer to push the material that has previously been resting on the door 16 into the casing 15 where it will be engaged by the plunger 29.

Partition members 73 are provided for separating the bales in the casing 15 and each partition member comprises a pair of plates overlapping each other and having flanges at their upper ends, one plate having a slot 74 therein and the other plate having a pin 75 thereon passing through the slot with a spring 76 located in the slot and pressing against the pin for pushing the plates apart. Each member is adapted to be inserted in a slot 77 (see Figure 2) in the side of the casing 15 after a bale has been formed so that the partition will separate this formed bale from the next one being formed. An opening 78 is formed under the outlet end of the casing 15 and this opening is of substantially the same length as the length of the bale and a casing 79 of wire mesh is adapted to be placed over this outlet end of the casing 15 with the bottom part of the casing passing through the opening 78. Thus the bale is pushed over the bottom of the casing 15 and against the rear end of the casing 79 and as the bale is gradually being pushed out of the casing 15 by the reciprocation of the punger 29, the casing 79 is moved from off the casing 15 until the bale is entirely removed from the casing 15 and then the bale will be in the casing 79. Then the end part 80 of the casing 79 can be swung downwardly over the end of the bale and fastened in place by the hooks 81.

A platform 82 is located at one side of the body at the rear end thereof so that an attendant can stand on said platform while putting the casings 79 in place and handling the bales coming from the device.

As shown in Figure 16 the different walls of the casing 79 are connected together by the hooks 81 so that the wire mesh can be readily separated from the bale, when the bale is to be used and then this wire mesh casing can be used on a new bale.

The packer 52 is preferably composed of the bars connected together as shown in Figure 9.

From the foregoing it will be seen that the chaff is delivered to the conveyor means which deposits it into the hopper and after the material rises to a certain point in the hopper it will be packed by the reciprocating packer member 52. After a certain amount of material has been placed in the hopper and the same packed by the member 52 the pressure will cause the door 21 to swing out of the hopper and this will cause rocking movement of the member 23 which exerts a pull upon the linkage 27 and swings the bar 18 into vertical position. Then this bar will be engaged by the upper end of the lever 31 on outward movement of the plunger 29 which will open the door 16 and this opening movement will cause the link 69 to rock the shaft 70 so that the long crank 71 will move upwardly and thus tilt the beam 47 and cause the packer 52 to push the material in the hopper through the opening left by the door 16, into the casing 15 where it will be acted upon by the plunger 29. When pressure is removed from the door 21 this door will move to the position shown in Figure 5 under the action of the spring 26 and the bar 18 will be swung to the inclined position shown in Figure 5 so that it will be out of the path of the upper end of the lever 31. The material deposited into the casing 15 each time the door 16 is opened, will be packed by the reciprocating plunger and the material being packed will cause the previously formed bales to move toward the outlet end of the casing and as each bale is pushed out of the casing it will be enclosed by the wire mesh casing 79 and when the bale has entirely left the casing 15 the attendant swings the end 80 of the casing 79 over the end of the bale and fastens said end 80 in place by the hooks 81. The reciprocatory movement of the plunger 29 can be stopped whenever the operator desires by moving the clutch means to disengaged position by means of the lever 38, and by releasing the clutch means 63' the conveying means and packing means will be stopped. A spring 81' can be used for yieldingly holding the wire casing 79 on the rear of the casing 15 so as to offer resistance to the pushing of casing 79 from casing 15.

A ridge member 10' is used to separate the straw from the chaff, the straw falling to the ground and the chaff passing up the conveyor 11. This member is shown in detail in Figure 17 and is placed over the inlet end of the conveyor 11 so that straw discharging from the combine or harvester will drop upon this member and be directed by the member to each side of the conveyor 11 thus being prevented from entering the conveyor while the chaff coming down the chute 10 will be picked up by the conveyor 11 and carried to the packer 12.

Having described the invention, what is claimed as new is:

1. A trailer attachment for a combine comprising a wheel supported body, a hopper carried by the body, conveying means for conveying chaff from the threshing part of the combine into the hopper, a horizontally arranged casing receiving the material from the hopper, a packer member operating in the hopper, means for reciprocating the same from one of the ground wheels of the device, a plunger operating in the casing and operated from one of the ground wheels, a door controlling communication between the hopper and the casing, a member connected with the door, means for moving said member into the path of the plunger to cause the plunger to open the door, when a certain amount of packed material is in the hopper, such material actuating said means and means actuated by the opening movement of said door for reciprocating the packer to a greater extent than its first mentioned reciprocating means to force the material from the hopper into the casing.

2. In a baling machine, a horizontally arranged casing, a plunger reciprocating in the casing, a hopper rising from the casing, a sliding door controlling communication between the hopper and the casing, a member pivotally connected with the door and in one position being out of the path of movement of the plunger, a pivoted member located in an opening in the hopper and normally extending into the hopper and pressed outwardly when a certain amount of material has been packed in the hopper, means for moving the pivoted member of the door into the path of the plunger by outward movement of the member extending into the hopper, whereby the plunger will open the door.

3. In a baling machine, a horizontally arranged casing, a plunger reciprocating in the casing, a hopper rising from the casing, means for packing material placed in the hopper, a sliding door controlling communication between the hopper and the casing, a member pivotally connected with the door and in one position being out of the path of movement of the plunger, a pivoted member located in an opening in the hopper and normally extending into the hopper and pressed outwardly when a certain amount of material has been packed in the hopper, means for moving the pivoted member of the door into the path of the plunger by outward movement of the member extending into the hopper, whereby the plunger will open the door, and means actuated by the opening movement of the door for increasing the downward movement of the packing means in the hopper to cause such means to force the material from the hopper into the casing.

4. In a baling machine, a horizontally arranged casing, a hopper rising from the casing, means for feeding material into the hopper, an upright rising from the casing, a walking beam pivoted to the upper end of the upright and extending into the hopper, a packer member connected with the beam and reciprocating in the hopper, a crank shaft journaled in the upright and having its crank engaging a part of the walking beam to rock the same, means for actuating the shaft, a second crank shaft journaled in the upright and having a longer crank than the first-mentioned shaft, for engaging the beam to move the packer downwardly to a greater degree than the downward movement imparted to the packer by the crank of the first shaft, a plunger reciprocating in the casing, means for actuating the plunger, a sliding door controlling communication between the hopper and the casing, a pivoted member connected with the door, said hopper having an opening therein, a member pivotally connected with the hopper and normally extending into the opening and moved outwardly when a certain amount of material has been packed in the hopper and means actuated by such outward movement for moving the pivoted member connected with the door into the path of the plunger for causing the plunger to open the door and means for rocking the second crank shaft by movement of the door.

JOHN M. DALIMATA.